(12) United States Patent
Levine

(10) Patent No.: US 6,792,082 B1
(45) Date of Patent: Sep. 14, 2004

(54) VOICE MAIL SYSTEM WITH PERSONAL ASSISTANT PROVISIONING

(75) Inventor: Uri Levine, Ramat Hasharon (IL)

(73) Assignee: Comverse Ltd., Tel Aviv (IL)

(*) Notice: Subject to any disclaimer, the term of this patent is extended or adjusted under 35 U.S.C. 154(b) by 0 days.

(21) Appl. No.: 09/394,892

(22) Filed: Sep. 13, 1999

Related U.S. Application Data

(60) Provisional application No. 60/099,958, filed on Sep. 11, 1998.

(51) Int. Cl.[7] ............ H04M 1/64; H04M 3/42; H04M 3/00
(52) U.S. Cl. .......... 379/67.1; 379/88.01; 379/88.04; 379/88.17; 379/88.18; 379/201.07; 379/265.01; 379/265.05; 379/266.06
(58) Field of Search ............ 379/67.1, 70, 74, 379/85, 88.01, 88.02, 88.03, 88.04, 88.05, 88.07, 88.08, 88.13, 88.16, 88.17, 88.18, 88.25, 201.01, 201.07, 201.11, 207.12, 214.01, 265.01, 265.05, 265.1, 266.06

(56) References Cited

U.S. PATENT DOCUMENTS

| | | | |
|---|---|---|---|
| 4,313,035 A | 1/1982 | Jordan et al. | 379/211.02 |
| 4,371,752 A | 2/1983 | Matthews et al. | 379/88.26 |
| 4,580,012 A | 4/1986 | Matthews et al. | 379/245 |
| 4,581,486 A | 4/1986 | Matthews et al. | 379/88.26 |
| 4,585,906 A | 4/1986 | Matthews et al. | 379/88.26 |
| 4,602,129 A | 7/1986 | Matthews et al. | 379/88.26 |
| 4,674,115 A | 6/1987 | Kaleita et al. | 379/216.01 |
| 4,696,028 A | 9/1987 | Morganstein et al. | 379/88.24 |
| 4,720,846 A * | 1/1988 | Hattori | 379/79 |
| 4,752,951 A | 6/1988 | Konneker | 379/201.07 |
| 4,809,321 A | 2/1989 | Morganstein et al. | 379/209.01 |
| 4,850,012 A | 7/1989 | Mehta et al. | 379/157 |
| 4,876,707 A | 10/1989 | Hashimoto | 340/721 |
| 4,922,520 A | 5/1990 | Bernard et al. | 379/88.11 |
| 4,922,526 A | 5/1990 | Morganstein et al. | 379/157 |
| 4,926,462 A | 5/1990 | Ladd et al. | 379/88.26 |
| 4,955,047 A | 9/1990 | Morganstein et al. | 379/198 |
| 4,989,234 A | 1/1991 | Schakowsky | 379/92.03 |
| 5,020,095 A | 5/1991 | Morganstein et al. | 379/88.23 |
| 5,027,384 A | 6/1991 | Morganstein | 379/88.23 |
| 5,029,196 A | 7/1991 | Morganstein | 379/88.23 |
| 5,029,199 A | 7/1991 | Jones et al. | 379/88.26 |
| 5,109,405 A | 4/1992 | Morganstein et al. | 379/88.21 |
| 5,155,761 A * | 10/1992 | Hammond | 379/67 |
| 5,168,517 A | 12/1992 | Waldman | 379/67.1 |

(List continued on next page.)

FOREIGN PATENT DOCUMENTS

| | | |
|---|---|---|
| DE | 3501814 | 7/1985 |
| DE | 3240589 | 5/1993 |
| EP | 0295470 | 12/1988 |
| EP | 498593 | 8/1992 |
| JP | 1109861 | 10/1987 |
| JP | 63-86647 | 4/1988 |
| WO | 92/22164 | 12/1992 |

OTHER PUBLICATIONS

Patent Abstracts of Japan, vol. 12, No. 414, Nov. 2, 1988 for Japanese Application 63–152258, Jun. 24, 1988.

Hattori et al., "Personal communication–concept and architecture", IEEE International Conference on Communications, vol. 4, Apr. 15, 1990, Atlanta, USA, pp. 1351–1357.

*Primary Examiner*—Allan Hoosain
(74) *Attorney, Agent, or Firm*—Staas & Halsey LLP

(57) ABSTRACT

A personal assistant system uses context to intelligently make contacts and for provisioning an address book. The system can be customized by subscribers for all or specific contacts. The system uses history information to make predictions of whether calls will be successful when no preference is specified by the user.

19 Claims, 15 Drawing Sheets

U.S. PATENT DOCUMENTS

| | | | |
|---|---|---|---|
| 5,206,901 A | | 4/1993 | Harlow et al. .......... 379/207.07 |
| 5,243,645 A | | 9/1993 | Bissell et al. ........... 379/211.02 |
| 5,260,986 A | | 11/1993 | Pershan ....................... 455/413 |
| 5,327,486 A | * | 7/1994 | Wolff et al. ............... 379/93.23 |
| 5,471,519 A | * | 11/1995 | Howe et al. ................... 379/67 |
| 5,475,748 A | | 12/1995 | Jones .................... 379/211.04 |
| 5,519,773 A | * | 5/1996 | Dumas et al. ............... 379/265 |
| 5,544,231 A | * | 8/1996 | Cho ........................... 379/67.1 |
| 5,555,299 A | * | 9/1996 | Maloney et al. ........ 379/212.01 |
| 5,608,786 A | * | 3/1997 | Gordon ....................... 379/100 |
| 5,619,556 A | * | 4/1997 | Richardson, Jr. et al. ..... 379/88 |
| 5,652,789 A | * | 7/1997 | Miner et al. ................. 379/201 |
| 5,706,334 A | * | 1/1998 | Balk et al. .................... 379/67 |
| 5,742,905 A | * | 4/1998 | Pepe et al. ................... 455/461 |
| 5,802,161 A | * | 9/1998 | Svoronos et al. ....... 379/216.01 |
| 5,802,166 A | * | 9/1998 | Garcia et al. ................ 379/372 |
| 5,867,559 A | * | 2/1999 | Jorgensen et al. .......... 379/67.1 |
| 5,870,549 A | * | 2/1999 | Bobo, II ................. 395/200.36 |
| 5,884,032 A | * | 3/1999 | Bateman et al. ........ 395/200.34 |
| 5,884,262 A | * | 3/1999 | Wise et al. .................. 704/270 |
| 5,889,799 A | * | 3/1999 | Grossman et al. ..... 379/266.08 |
| 5,946,386 A | * | 8/1999 | Rogers et al. ......... 379/265.09 |
| 5,999,965 A | * | 12/1999 | Kelly ......................... 709/202 |
| 6,070,070 A | * | 5/2000 | Ladue ........................ 455/419 |
| 6,167,119 A | * | 12/2000 | Bartholomew et al. .. 379/88.04 |
| 6,278,772 B1 | * | 8/2001 | Bowater et al. .......... 379/88.13 |
| 6,292,480 B1 | * | 9/2001 | May .......................... 370/352 |
| 6,324,274 B1 | * | 11/2001 | Akester et al. ......... 379/201.02 |
| 6,587,867 B1 | * | 7/2003 | Miller et al. ................ 709/200 |

\* cited by examiner

| NAME | HOME PHONE | OFFICE PHONE | MOBILE PHONE | DEFAULT PHONE | FAX | EMAIL | PAGER | SMS | VOICE MAIL |
|---|---|---|---|---|---|---|---|---|---|
| JOHN DOW | 555-1212 | Yyy | Zzz | | | Xxx@yy.com | 1-800-skypage...PIN#My phone# | Zzz | Zzz |
| JANE DOW | 555-1212 | AAA | BBB | | CCC | Xxx@yy.com | | | |
| | | | | | | | | | |

FIG. 11 mailserver.com;;BobJones;;faoBAR;...

Y;4.0;;3;;DATE,FROM,SUBJECT,BODY;;*@hotmail.com,"xxx*@*.*",goloom, SUBJECT=("sex",BODY=("sex")OR("xxx")

FIG. 12

| Operation | Input Data | VM | Home | Work | Mobil | Other | Fax | E-mail1 | E-mail2 |
|---|---|---|---|---|---|---|---|---|---|
| End Msg: Send | Fax | | | | | | 1 | 2 | |
| End Msg: Send | E-Mail | | | | | | 2 | 1 | |
| End Msg: Transfer | Voice Mail | 1 | | | | | 3 | 2 | |
| Call / Dial | | | 4 | 3 | 2 | 1 | | | |

FIG. 14

VOICE MAIL SYSTEM WITH PERSONAL ASSISTANT PROVISIONING

CROSS-REFERENCE TO RELATED APPLICATION

This application is related to provisional application 60/099,958, filed Sep. 11, 1998 entitled VOICE MAIL SYSTEM WITH PERSONAL ASSISTANT PROVISIONING, MESSAGE INFORMATION DISPLAY, CALL RETURN AND CALL LOGGING and to the provisional application filed concurrently by the same inventor entitled, MESSAGE INFORMATION DISPLAY, CALL RETURN AND CALL LOGGING, both incorporated herein by reference.

BACKGROUND OF THE INVENTION

1. Field of the Invention

The present invention relates to a system for assisting in telephone communications, particularly by users of mobile telephones, who also use other forms of communications and a variety of devices.

2. Description of the Related Art

In recent years, the use of mobile telephones by the general consumer has increased. In addition, computer telephony has become accepted by some users and there have been movements toward unified messaging where voice mail, electronic mail and facsimile messages are stored on a single information services system and can be delivered to many different devices, as either or both visible and audible information. However, existing systems are not always easy to use and often require that many parts of the communication network use proprietary technology.

Attempts to improve this situation include the development of what are termed personal assistants, such as those available from Wildfire, General Magic (Portico) and voice activated dialing systems available from Brite and Intellivoice. However, these solutions have drawbacks of their own, including the time-consuming process of getting contact information into the system.

There are several well-known voice recognition products in the market place separated into small vocabulary category such as VCS and large vocabulary category such as Nuance, Altech, L&H, Philips and more. This technology are the fundamental key technology for all Personal Assistant systems as well as any other network based voice control applications such as voice activated dialing (VAD), voice control voice mail (VCVM). All Personal Assistant systems as well as all VAD systems offer the "placing a call" function. An example of a 'calling session' (disregarding error correction techniques and conversational dialogue afterwards) of first generation Personal Assistant systems (like Wildfire™) and voice activated dialing (VAD) systems would be:

Sub: 'Call'
Sys: 'Who Should I call'
Sub: 'John Dow'
Sys: 'At which location?'
Sub: 'Home'
Sys: 'OK'

Text-to-speech is a well-known technology that enables computers to convert and play written text to synthesized voice. These products are available today by fairly large number of providers including lucent technologies, L&H, IBM and more. One of the most usable applications of this technology is an 'email reader' the ability to read an email message through a telephone or at least the email header (such as sender, delivery time and subject line).

Short Message Service (SMS) is a well-known short text messages communication method in digital mobile networks. The functionality is available in GSM, PCS, CDMA and TDMA network and uses the data channel to send messages back and forth between a subscriber handset and other subscribers, email and voicemail systems and other systems that are connected together. Basic SMS capabilities include: sending a short text message to the subscriber handset, sending a short message from one subscriber handset to another valid destination, converting an email message format to SM format and sending it to a subscriber handset, accepting voice mail MWI codes to be displayed on the subscriber's handset, and converting SM originated by the subscriber handset into emails and send them to an email address.

It is a common feature to send email messages to subscriber handsets via Short Message, these messages can be sent directly to the SM address (which is also a valid email address), or they can be sent via a mailbox repository for example the TRILOGUE INfinity Unified Mailbox. Once the message is deposited in the mailbox, an automatic setup can determine to copy the entire message or the message header or a summary of the mailbox content to the subscriber handset via a short message. Another type of text messages that can be schedule to be copied (or header or summary) to the subscriber SM display are the fax messages using a fax-to-text converter (OCR) technology. In addition, the TRILOGUE INfinity system as well as other voicemail and unified messaging systems provide the ability to listen to email messages or to email headers via the telephone, based on text-to-speech (TTS) technology.

SUMMARY OF THE INVENTION

It is an object of the present invention to provide message information embedded in a standard communication protocol.

It is another object of the present invention to display information about messages for a subscriber of a message service by using the message information embedded in a standard communication protocol.

It is an additional object of the present invention to provide a personal assistant service that can be easily provisioned with information about contacts.

It is a further object of the present invention to associate a call return number with a message for a subscriber.

It is yet another object of the present invention to record telephone conversations in a voicemail system.

To achieve these objects, the present invention provides a messaging system, including an information services system to store messages for subscribers and to embed encoded information in calling line identification signals; and at least one communication device, connectable to the information services system to receive the calling line identification signals, having a visual display to display the encoded information.

Preferably, the information services platform provides information services to at least one subscriber, including a personal assistant service for making outgoing calls in response to instructions from the subscriber; and the communication device accesses the information services for the subscriber, including storing on the information services platform contact information associated with a message from a sender for future communication with the sender of the message, when the subscriber inputs a request to add the contact information when the message is being reproduced for the subscriber.

Preferably, the information services system also stores a return call number and subsequently receives a message for a subscriber associated with the return call number; and the communication device receives information related to the message from the information services system, displays the information related to the messages and is capable of making a call to the return call number.

Preferably, the information services platform stores a message for a subscriber and generates audio signals from the message; and the communication device receives and outputs the audio signals and displays text associated with the message in response to a request by the subscriber generated during output of the audio signals.

Preferably, the communication device produces an instruction to reach a contact in response to a request from a subscriber; and the information services platform stores items of contact information for the contact under control of the subscriber and attempts to reach the contact using the items of contact information in a specified sequence upon receipt of the instruction from the communication device.

Preferably, the information services platform includes at least one telephone network interface unit, connected to at least one telephone network, to receive telephone calls from callers and to send and receive signals to and from subscribers; at least one message storage unit, coupled to the at least one telephone network interface unit, to store messages received when the subscriber is not connected and to record conversations when the subscriber is connected; and a control unit to control recording of the conversations in response to a log signal from the subscribers.

Preferably, the communication device includes a telephone network interface unit, connectable to the at least one telephone network; a voice frequency signal input/output unit coupled to the telephone network interface unit; a keypad, coupled to the telephone network interface unit, including keys to generate control signals for the information services system to log into the information services system, to listen to messages stored on the information services system, to select another message stored on the information services system, to delete a selected message stored on the information services system, to record voice signals, and to update contact information based on data associated with an informative message.

Preferably, according to the present invention a method of establishing a telephone connection is performed by displaying an electronic message to a user; and establishing the telephone connection to a telephone number associated with the electronic message in response to a request from the user.

Additional objects and advantages of the invention will be set forth in part in the following description and, in part, will be obvious therefrom or may be learned by practice of the invention.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIGS. 4, 8 and 12 are message formats used in communicating with devices connected to the system.

FIG. 5 is a waveform example.

FIG. 11 is an example of a screen display of an address book.

FIG. 14 is a preference table layout.

DESCRIPTION OF THE PREFERRED EMBODIMENTS

Figure 1:
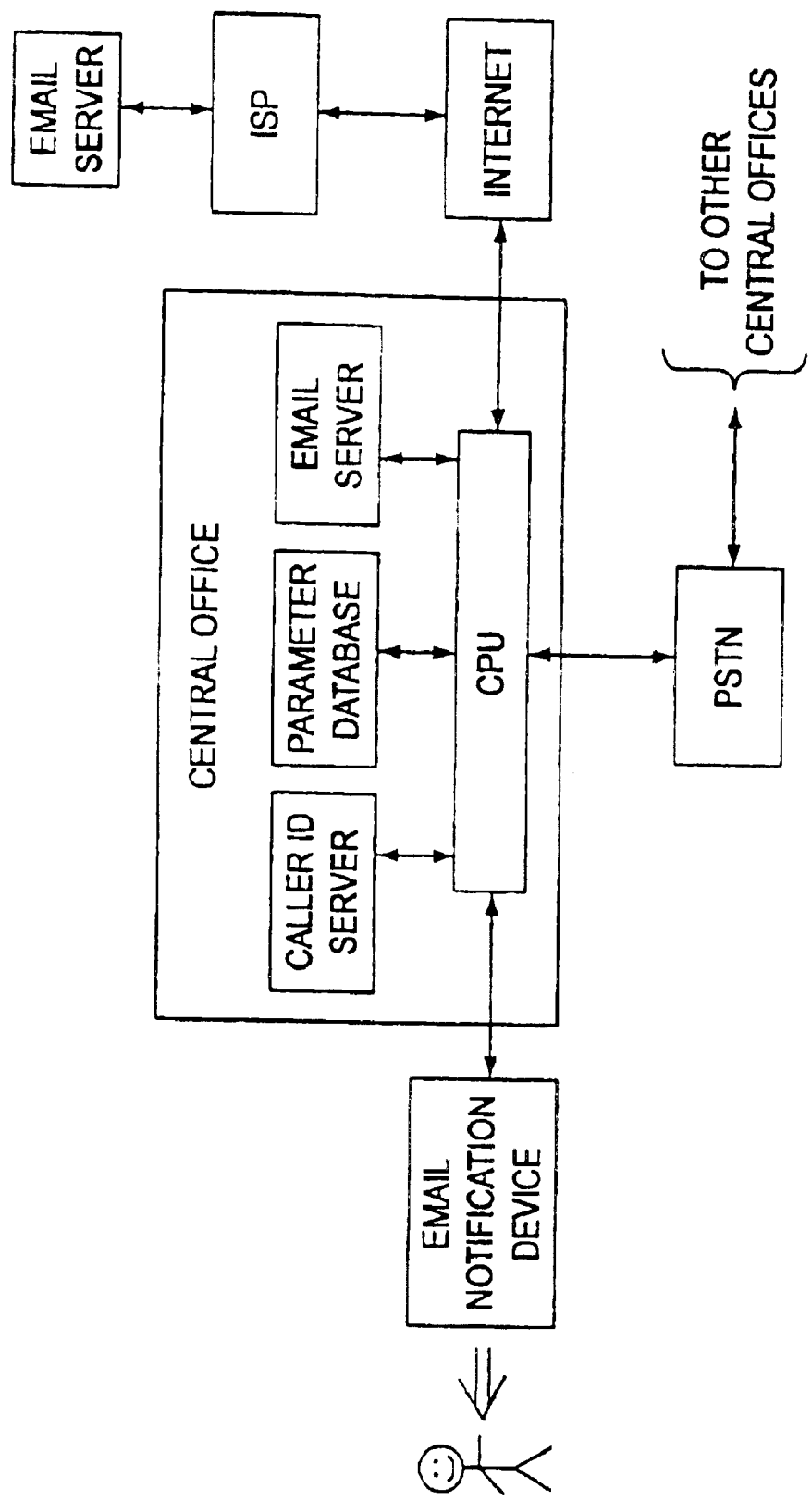
FIGS. 1–3, 9 and 18 are block diagrams of a system according to the present invention.

The Comverse Personal Assistant (PA) is a leading-edge technology option for TRILOGUE™ INfinity® and Access NP Voice Messaging, primarily for wireless networks. The PA uses voice recognition and Voice-Activated Dialing technology to create a service that can virtually replace a live secretary for many daily activities such as calling, messaging and scheduling. The service can be accessed through a convenient user friendly interface from a telephone handset, "smart phone", or PC. The Personal Assistant provides "hands-free" Voice Activated Dialing, which is a convenience at home and a legal necessity for wireless operation in motor vehicles in many countries. The PA also provides a host of other "hands-free" services. The interface uses near-natural language recognition and is easy to learn and use, without the aid of extensive documentation. The services include management of voice, fax and e-mail messages, maintenance of an address book and distribution lists. These services help subscribers to better manage their time, calling activities, messaging and other communication services.

The Personal Assistant will attract and keep subscribers in the lucrative high-end business market, subscribers who make the most use of wireless systems and voice mail and subscribers who must have hands-free operation for mobile use from their automobile. The PA is an add-on component to existing Comverse systems that synergizes with other high-end options such as Unified Messaging and the Mobile Visual Mailbox. It makes these applications more attractive, and helps ensure that subscribers will use them frequently.

The Comverse Personal Assistant uses state of the art voice recognition and voice-activated dialing technology. It is completely integrated with messaging, communications, management and telephony functions of Comverse voice messaging systems.

The Personal Assistant provides a single voice controlled user interface for the subscriber, using an almost natural language interface. Using this interface, the subscriber can: place a call, transfer a message, forward a message to another subscriber, reply to a message, return a call, maintain an address book and distribution list, listen to e-mail through text-to-speech conversion, hear the name of a caller or person who left a message, schedule a meeting or appointment, cancel a scheduled meeting, hear or view the schedule, and maintain a to-do list.

The directory of address and telephone numbers includes all relevant information about the addressee, such as name (Voice Tag, Text and Recognition Pattern), home phone, office phone, mobile phone, default phone, e-mail address, fax number, voice/fax mailbox, pager address (dialing sequence), short message service (SMS) address, and other contact information like a street address.

The directory includes a multi-directional find feature, that allows retrieval of a telephone number by name, or, for example, retrieval of the name from the e-mail address. Existing directory services can access the other directories through LDAP standard protocol.

Other features include:
1. The PA supports a variety of Personal Digital Assistant (PDA) terminals and WAP and HDML standard "smart phones" as these devices are introduced. The PA address list synchronizes with local personal directories on PDAs and on PCs.
2. The user is able to update the Address Book quickly and easily through a variety of methods using the telephone-based voice interface, PC browser, integrated smart phone or export/import of existing directories.

The Personal Assistant features a near-natural voice interface that can be commanded to the same task in a number of different ways. The interface is easy to learn and easy to use, featuring near-natural commands. Though in fact the subscriber uses a relatively limited command set, the user interface is engineered so that these commands "feel" like natural conversation. Built in training aids, tutorials and prompts guide the new user to issue commands the system recognizes. As the user becomes familiar with the interface, the help prompts fade away.

The interface includes considerable built-in intelligence and flexibility. Following are examples of commands that can be used with the voice interface:

Subscriber: "Call John Miller at home." Or

Subscriber: "Could you please dial the office of John Miller." Or

Subscriber: "Call John Miller."

PA: "home or work?"

Subscriber: "home."

Intelligence improves recognition to improve recognition rates, the interface features intelligent prompting according to the level of confidence with which a word or name was recognized. For example, the subscriber may say, "Please call <John Smith>". When there is excellent recognition, the system will reply, "I'm Calling <John Smith>" and the subscriber can say "No" to cancel. When there is good recognition, the system will reply, "Do you want me to call <John Smith>?" and the subscriber can say "No" to cancel. If there are two recognition alternatives, the system will say "Did you say <John Smith> or <Jan Smith>?" If there is poor recognition, the system will say "Can you spell that for me please?"

Placing calls is the most usable service of a Personal Assistant system. The system uses near natural language recognition techniques, so the subscriber may say 'call John Dow at Home' and let the system determine the command (call), the name (John Dow) and the location (home). The system combines the ease of use of voice recognition and near natural language user interface, supported by a large and multiple entry address book.

In addition the Personal Assistant provides sequential searching capabilities based on the subscriber defaults or search order for a contact. When placing a call, the subscriber might say 'call John Dow at the office' or 'Call John Dow'. If the latter is used, the system will analyze the search order for John Dow at the Address Book, and will assume what location to search first. Alternatively if there is no search order set for John Dow, the system will ask the subscriber 'Home? Or Office?' according to the actual information in the Address Book, so if there is only one number in the Address Book, the system will not ask for location and establish the call immediately. The dialogue with the subscriber in this case is shorter, not only because the user interface design guides the caller via very short prompts of what input is expected, but mainly because the system uses all 'known' information like number of phone numbers exist for the contact, the search order (e.g. home first, office second and mobile third, if the search order indicates that for a particular contact the home phone should be tried first followed by the office phone and last the mobile phone). The system will not even ask for location (although it could be specified and override the search order).

The Personal Assistant also monitors the call progress, and offers several options/actions if the call was not established. For example, if the call were busy, the system would offer the subscriber either redial or try another location/number. Similarly, if there is no answer, i.e., "ring no answer" (RNA), the system shall suggest the subscriber to try another location. This is done based on the existing information of the phone book (actual entries), preference table and history usage. There are two important parts of the history usage that are being used here, (a) what location already has been tried and (b) what's the probability of reaching the called person at which location. In addition, the user interface offers the location based on the number of un-tried locations and their probability of answering the call.

Figure 13:
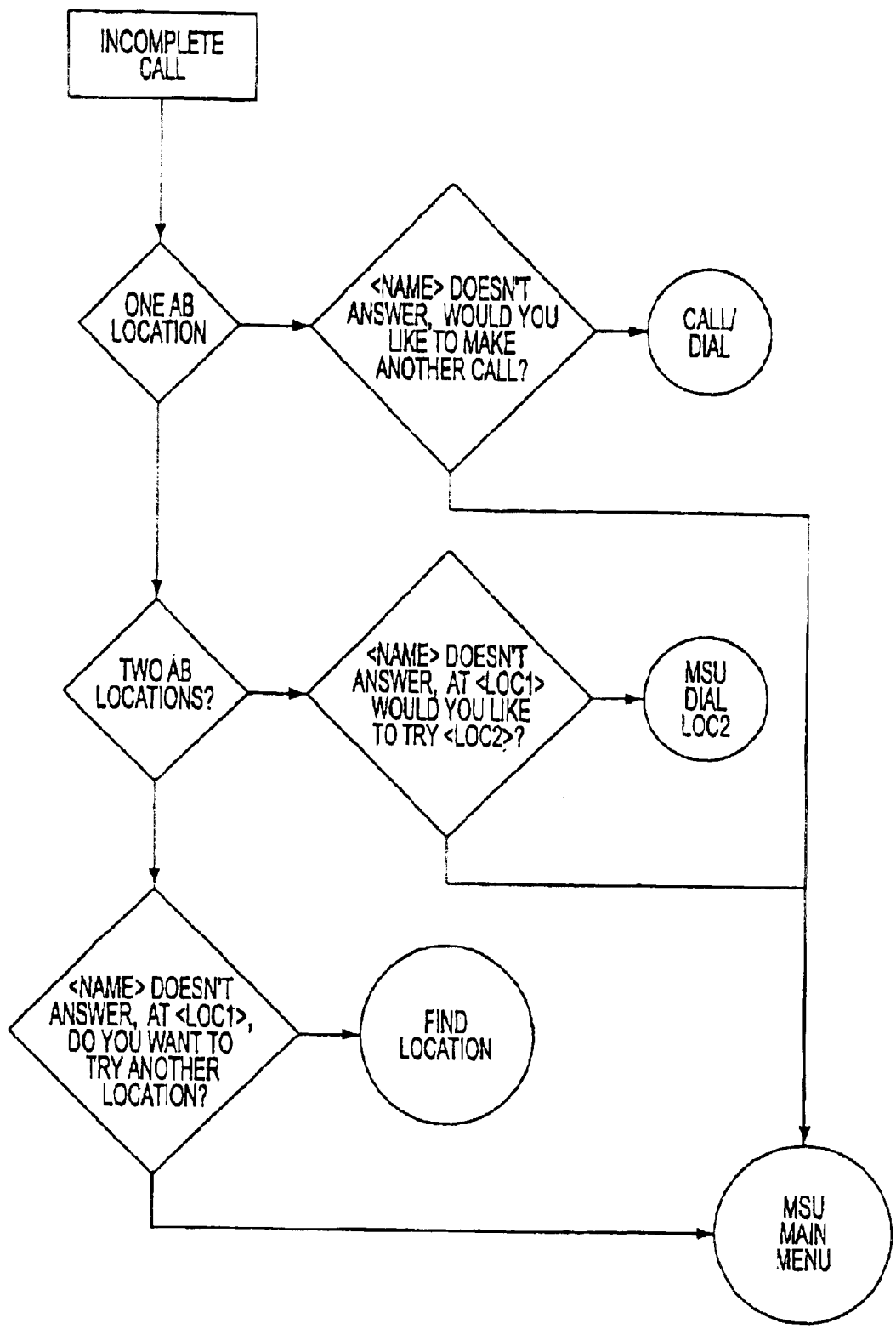
FIGS. 13 and 17 are flowcharts of methods according to the present invention.
Figure 16:
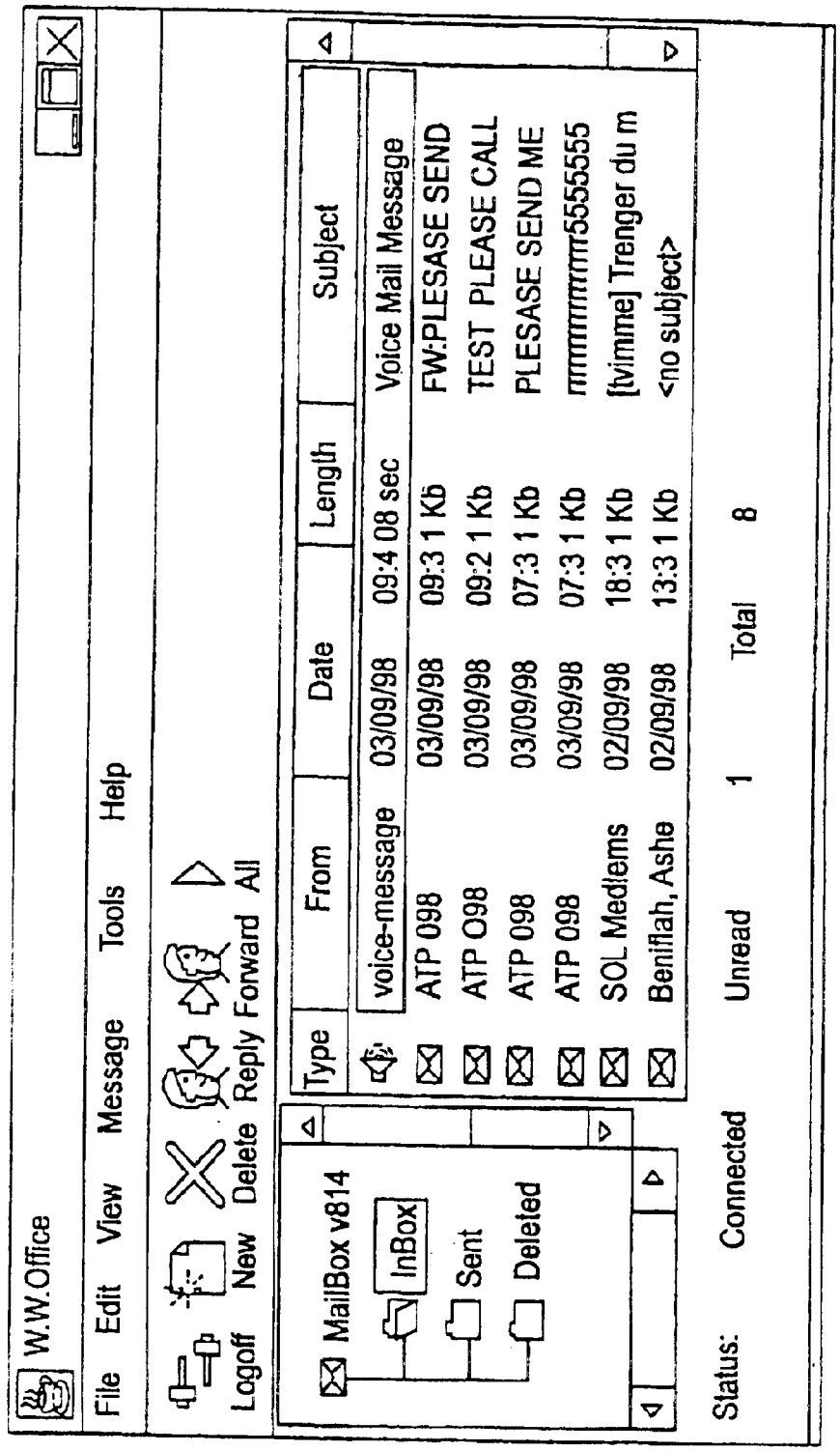
FIG. 16 is an example of a screen display produced by the system for unified messaging.
Figure 17:
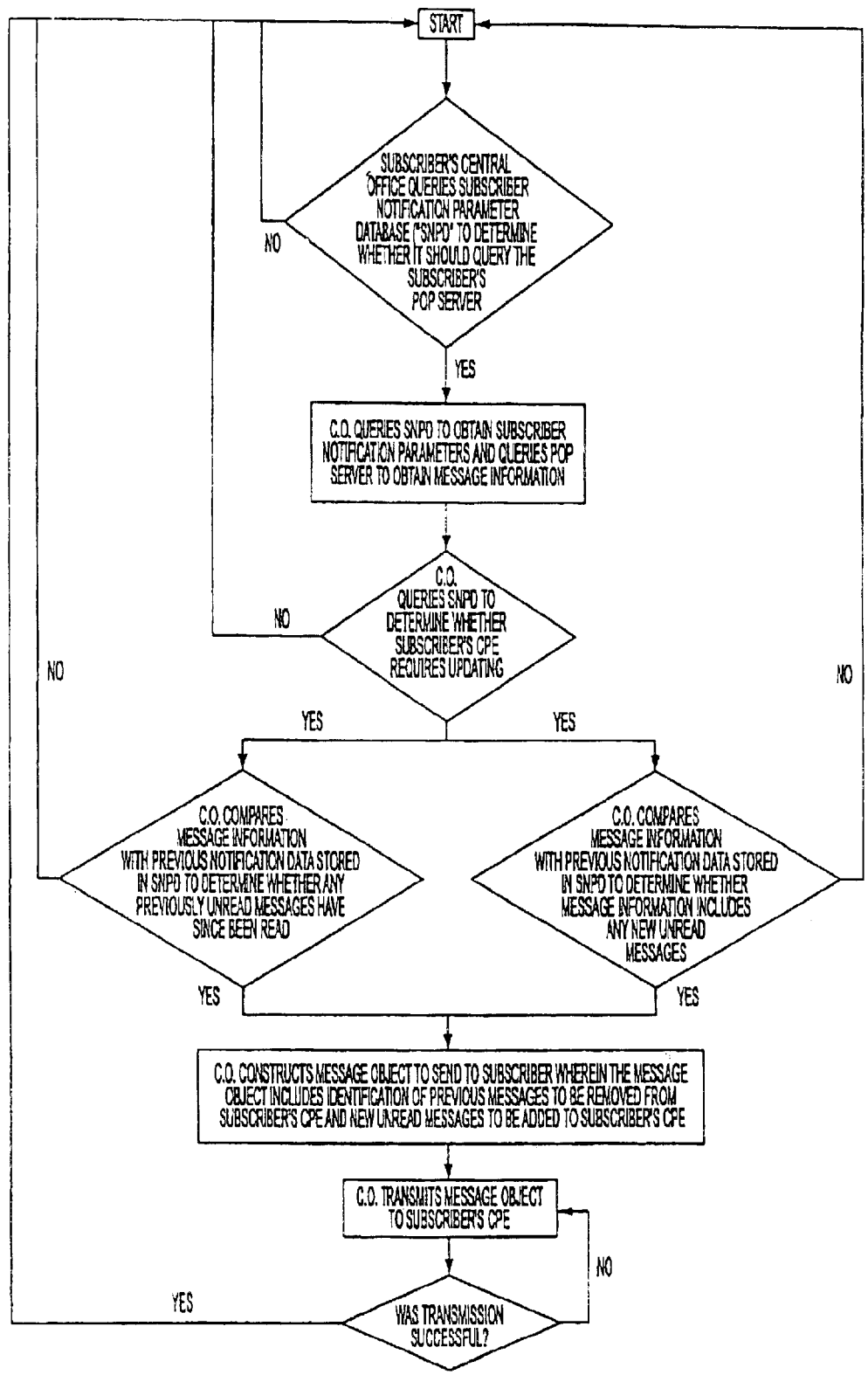
Figure 18:
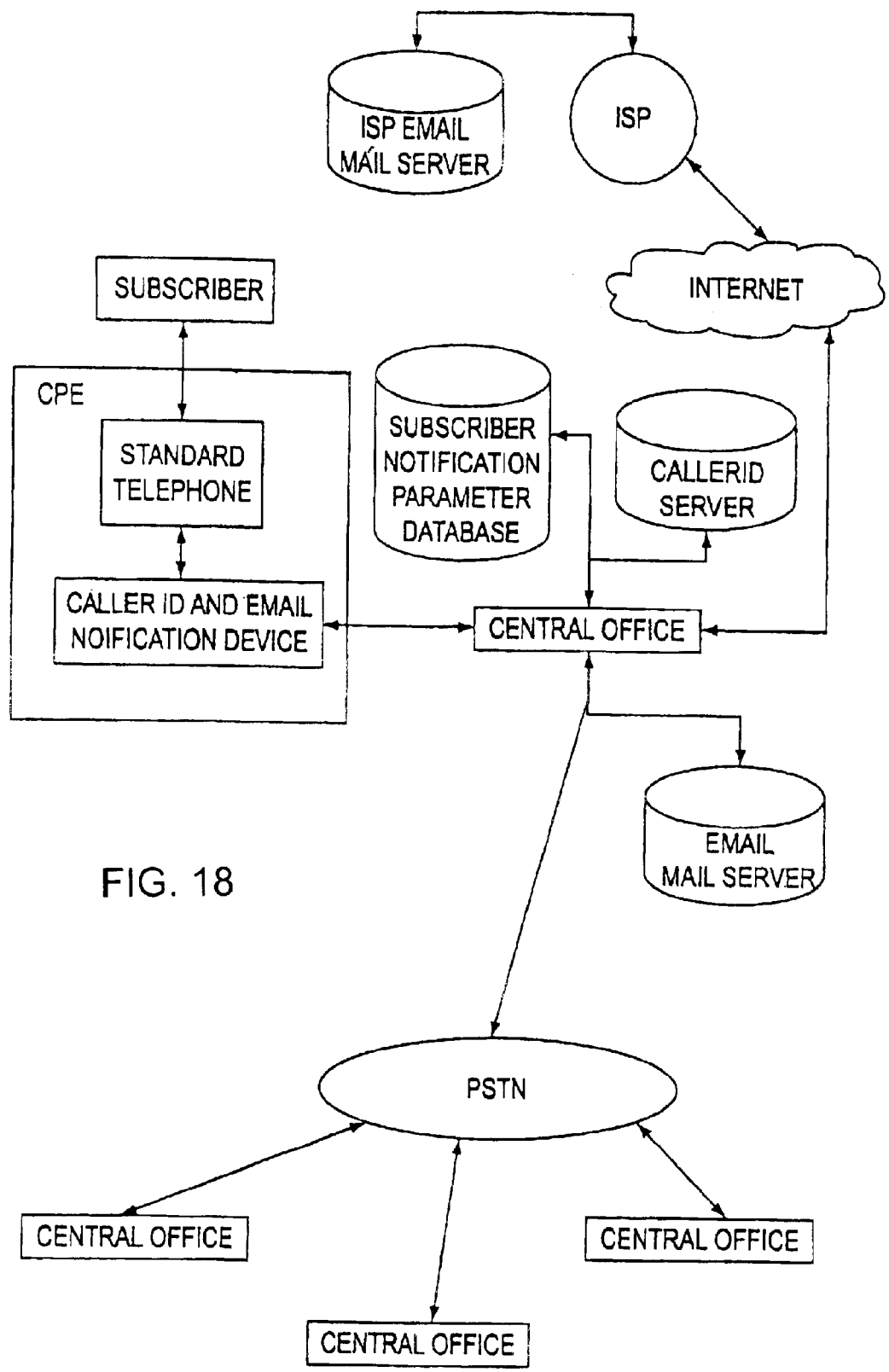

The flow chart in FIG. 13 demonstrates some of the capabilities of the semi-automatic search. An incomplete call is being evaluated to determine why it is incomplete. For example, assume "ring no answer". The subscriber preference table for this contact (called person) is checked and if an order provided, the system will prompt, e.g., 'I'm trying John Dow at the Mobile' according to the table. The subscriber may say 'no' or 'cancel' to stop the call from progressing. If the preference table does not suggest an order, and there are at least three more locations, the system will prompt 'Do you want to try another location?' If the subscriber says yes, then the system will ask 'In which location?' The system would used the probability per location only if there is nothing said by the subscriber. In that case the system will extend the prompt suggesting 'Mobile, Office, or default' assuming that the first call was made to the home phone. The prompt suggests the location according to their likelihood of completing the call, as there are some history usage. (e.g., the mobile number is the most likely to answer at that time and day and the office is afterwards)

If the number of existing un-tried location in the address book is two, then the system will offer to try another location but with a different script (prompt). 'John Dow does not answer at Location1, do you want to try at the Location2?' (note that location 2 is being selected according to either preference table or usage history). If the subscriber says 'no', then the system suggests 'location 3'.

If there is only one more number in the Address Book for that name, the system will instantly try to offer that number for a continuation call. When there are no more locations, for that person, the system will still suggest other means of communication for example sending a page or a message to the person; or redialing or calling another number.

The capability of semi-automatic search is always available for the subscriber of the system, when they command the system to call. The system can also perform the entire search completely automatically. The same kind of logic applies, starting with the preference table. If there is no significant definition (e.g., home, office and mobile are at the same priority level), then history and usage analysis is used to determine which number should be called first, second, third, etc.

To invoke the automatic search mode, the subscriber commands the system with the command, 'Get me' followed by a name. When the subscriber commands the system to search for a name, the system then looks at the address book for all the possible contacts for that name. The preference table determines the search order for that name, and if there is no preference table for that person, then the default preference table is used. If the preference table has an indifference order (e.g., first priority is to try to reach a person at the office, but the second priority is either mobile or home), then the system uses the history usage for calling these numbers and will start with the one with higher statistical probability to answer. This provides a service similar to personal number service for originating calls. When a subscriber wishes to reach someone she can have the Personal Assistant system perform several phone calls until the called party is reached, as if the called party had a personal number service. The system includes the ability to invoke other communication services like paging, sending a voice mail message or an email. This means that the subscriber of the Personal Assistant system has the ability to more easily and more efficiently reach other people, even those who do not subscribe to a Personal Number Service.

To avoid situations like one of the number being answered and the person that the subscriber is trying to reach is not available, the system offers two modes of operation:

1. Manual Selection: The subscriber determines on a call basis if the call is considered successfully (e.g., if the person answered the phone and the automatic search should be considered finished).
2. Automatic selection: The subscriber sets up an automatic mode in the preference tables for each and every entry or a default for all entries. In this mode the system first analyzes if the call was answered by a machine (like TAM or network based call answering system). If automatic answering was detected the system leaves a generated message, for example 'A call from <subscriber name> to <called party name>, please return the call at <subscriber preferred phone number.' If on the other hand the call was answered by a person, the system will prompt the called party, with 'there is a call waiting for <called party name> from <subscriber name>, are you ready to accept the call?' and then wait for a Yes/No answer.

Once the called party is ready to accept the call, the subscriber and called party are bridged. Note that the exact system phrases (prompts) and the exact user interface flow is highly customizable and the prompts given above and throughout are only examples.

When all phone numbers have been called, the system will switch to messaging communication mode, which allows the subscriber to record a message to be sent to the person, to send a page or to send predefined text message (via email or SMS). Again this is driven by the preference table which may set the messaging mode to a semi-automatic mode, complete automatic or manual mode and of course set the order of the communication means to be used. For example, a particular contact the subscriber may use the pager as the first mean of communication after calls are exhausted. In the paging mode there may be two methods, on-line in which the system will send a message like 'please call urgently <subscriber preferred phone number>' or off-line in which the text might be '<Subscriber Name> called, at <subscriber preferred phone number>'. From the system point of view the on-line mode will wait for the paged person to call back and connect to the subscriber when the call is established (supervised call). The off-line mode is just any other message type.

Voice messages can be sent to either the subscriber voice mailbox or to the subscriber's phone number (delivering of a voice message to a telephone). And text messages can be sent to an email address, an SMS address or a fax machine. For both types of messages the subscriber can set either defaults for all contacts or override for a specific contact, not only the order of execution but also the mode of operation and again there is the automatic mode or the semi-automatic mode. The automatic mode when related to messaging means that a predefined composed message will be sent, for example 'A message from <subscriber name> to <called party name>, please call me at <subscriber preferred phone number>.' The semi-automatic mode will allow the subscriber to compose an ad hoc message to be sent. Note that the message can be sent to multiple locations (e.g., email, voicemail and phone numbers).

An example of a preference table (PT) is provided in FIG. 14. Such tables exist for both default and individual contacts, which means that the subscriber can either use the defaults or override them. The preference table sets up the searching order as well as other semi-automatic action defaults. The PT may be set up by the subscriber via a world wide web page and can be also maintained via the telephone (using ASR and TTS technologies). The numbers in FIG. 14 represent the search order. When left empty the subscriber can choose ad hoc search order or use a default search for all the contacts in the Address Book.

When an entry in the PT is "clicked", other preferences associated with it are opened for view, modify, delete or add actions. For example, if the mode of messages is automatic or semi-automatic, or a schedule for the order.

The system offers multiple way to make a call, and provides a set of capabilities to complete an incomplete call via semi-automatic and automatic search modes. In terms of efficiency when the system uses all possible information and history usage to serve the subscriber better and suggest alternatives (e.g. for an incomplete call).

When there is some context associated with the call, the Personal Assistant offers almost human intelligence to make communication easier and more efficient for the subscriber. The semi-automatic search is one example, in which the system bases its decision on what the subscriber did so far (i.e., which number was called already and what was the result), and of course the history usage of the subscriber and the system. This is becoming more important when messaging and calling together. When a message is deposited in the mailbox, most likely there will be contact information associated with the message, such as CLID, sender ID (if the caller or the sender is another subscriber of the system, in that case all the contact information for the sender is available), email sender, and conversational information. As an example, when a message is deposited the system might ask the caller to provide contact information like, phone numbers, fax number, mailbox address etc. which will be stored with the message ready to be used.

When an email message is received, email contacts information can be extracted (e.g., from the email message sender information by accessing via standard protocols like VPIM or LDAP) to obtain contact information for the sender. In most cases emails are signed by contact information. The system will scan the email body text in order to obtain that information.

During a background messaging session, most of the contact information can be obtained, mostly via automatic mechanisms. This information is used for several functions provided by the Personal Assistant system, including instant provisioning as described below and placing in context calls. For example while listening to a message or following listening to a message, if the subscriber would say call, the system assumes that the call is in context with the message.

For example, assume a message with a captured CLI was deposited in the subscriber mailbox. The subscriber during the message header will hear the following information: Receiving time stamp, Message Class and Originator of the message. If the CLI exists in the address book, then the originator name (voice tag) will be played from the address book, otherwise just the originator phone number. Furthermore, if the originator happened to be a subscriber of the system then the system will play the caller voice signature (name) recorded by the caller.

While the message is being played or afterwards, the subscriber might use one of the context commands, for example, 'reply' in order to reply to the message with a message; transfer/forward/copy to send a copy of this message to another location; or "call" or "get me", etc. to place a call to the 'caller/sender' of the message.

When the subscriber commands the Personal Assistant system to call a person, all the contact information from the Address Book will be retrieved and the system announces 'I'm calling <name> at <Loc>' where name and location are taken from the Address Book to match the captured CLID. If the subscriber wishes to place the call to another location of that person, she can easily do that by saying no or cancel to halt the progressed call placing. If the subscriber stops the call then other locations or other names/phone numbers can be selected.

If the subscriber commands the system to get a person, then the context will be considered as the first rule of the preference table and that number will be tried first regardless of its order in the preference table. (Note the context override rule is also can be set up by the subscriber).

If the sender of the message is another voice mail subscriber, then the functionality remains pretty much the same, only the contact information can come from either the subscriber personal address book or from the system address book which holds information about the subscribers and about their willingness to expose the contact information.

In the case of call back on email, the subscriber can receives email messages in the same mailbox as voice and fax messages. When accessing via the telephone the system uses text to speech technology to read the subscriber the email header and message. The subscriber can place a call to the sender of this message, simply by saying 'call' or 'get' while or after the message is being played. In that case, the Personal Assistant will obtain the contact information for the sender, either from the subscriber address book (if the sender is there) or via standard VPIM or LDAP protocols to obtain the information from the email server of the sender, or by parsing the text message looking for contact information. Once the contact information is available, placing a call or getting the sender is the same as for any other context.

The address resolution process is as follows:
1. Get the email address of the sender
2. Reverse Lookup into the personal Address Book for that email address and obtain the name and phone numbers.
3. If unsuccessful, try to retrieve the contact information from the email server of the sender via standard VPIM or LDAP protocols.
4. If unsuccessful, try to parse the email message text to obtain contact information there.
5. Perform directory research for that name, assuming that the Sender email address includes enough information to obtain the rest of the contact information via standard directory services. The query would be sent to the directory server and the retrieved information can be used for context calling (or replying, sending, copying etc. as well for instant provisioning of the personal Address Book.)
6. If all means of automatic (background) obtaining the contact information exercised and yet no phone number (s) to call obtained. Ask the subscriber and allow the subscriber to complete the provisioning of that entry instantly.

The case of calling back on facsimile messages (when a CLI was captured) is similar to e-mail. Most systems in the world will not allow the function or alternatively would place a call back to the captured CLID. Obviously this captured CLI could be a wrong number to place a call, e.g., a facsimile machine number. The Personal Assistant will search the address book for matching real phone numbers for the captured CLI, again by performing reverse lookup in the address book for the captured CLI and obtaining the name and phone numbers associated with it.

If there is no information for that fax number in the address book, the system will try the following fallback methods:
1. Send a directory query to obtain the name of that directory number (CLID) and then the phone number of that name.
2. Analyze the Fax header or fax cover page and obtain the information from there. Again the information could be used by the subscriber for either instant provisioning or saving the information for future use or for context functions like calling back the sender of fax. Of course if the sender of this fax happens to be a subscriber of the system, then all the contact information can retrieved and saved internally.

For all these examples the common practice is that the system uses not only its original information stored with the caller or sender of the message, but also the local address book and any other contact information that might help in order to resolve the phone numbers of the caller. Once the list of phone numbers (at least one) was created (automatically) the subscriber can easily place a call to the caller/sender in a very efficient way.

Figure 2:
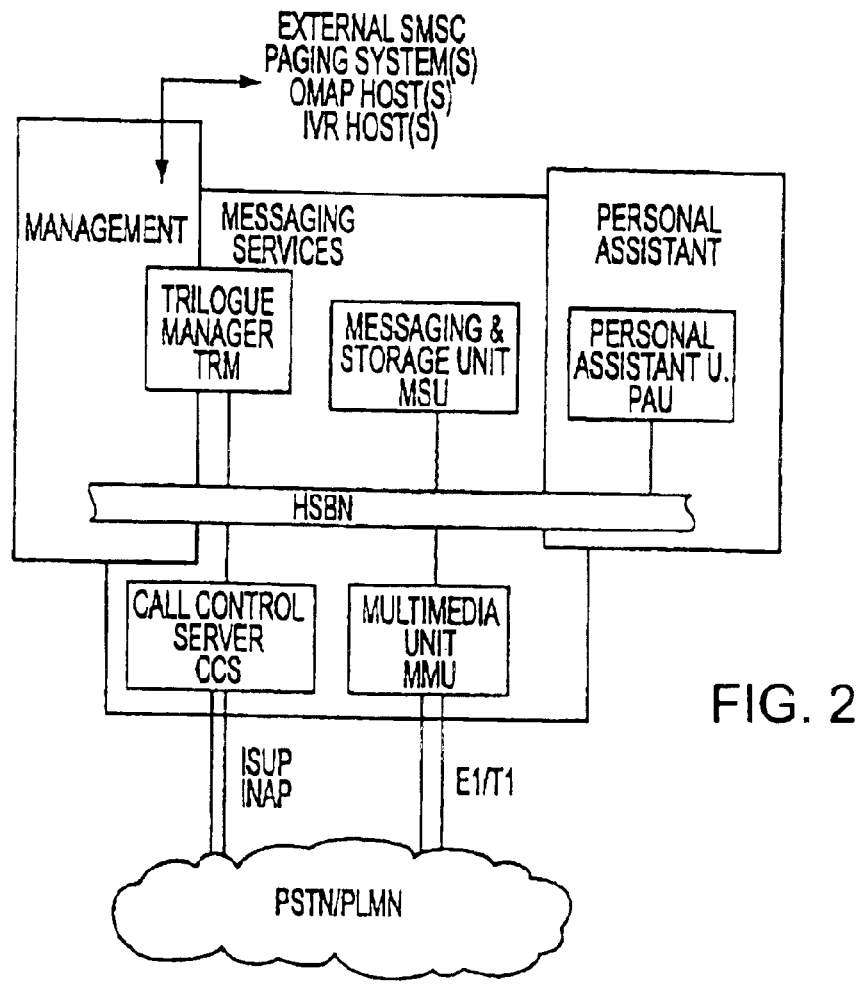
Figure 15:
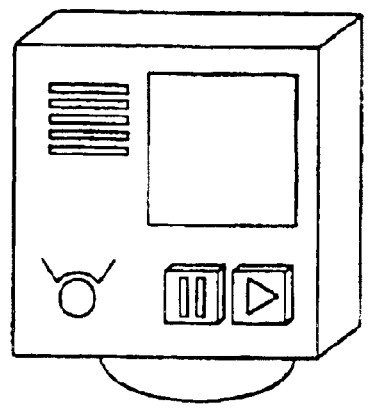
FIG. 15 is an exterior view of a display device used in communication with the system.

The Personal Assistant also recognizes the type of message and can deal with it by intelligent transfer. For example, "Transfer the message to Mary White" will transfer an e-mail message to an e-mail address, a fax to the fax number listed for the recipient and a voice message to the voice telephone number of the recipient. The Personal Assistant option is an integral part of the Unified Messaging system, as shown in the FIG. 2. It is also available as an integrated component of the Access NP system.

The main functions residing on the Personal Assistant platform include: intelligent dialing and self-provisioning. The Personal Directory Agent manages the address list.

Additional features related to Personal Assistant integration including the ASR Speech recognition system residing on the MMUs and triggers in voice and fax messaging applications and in Unified Messaging applications direct addressing function access to the directory on the PA.

The Unified Messaging platform provides text-to-speech capabilities along with a long list of other capabilities. The Personal Assistant with Unified Messaging (UM) module provides this feature controlled by spoken commands, so the subscriber while using a telephone can command the system to play an email message and take other action regarding the email message.

Figure 3:
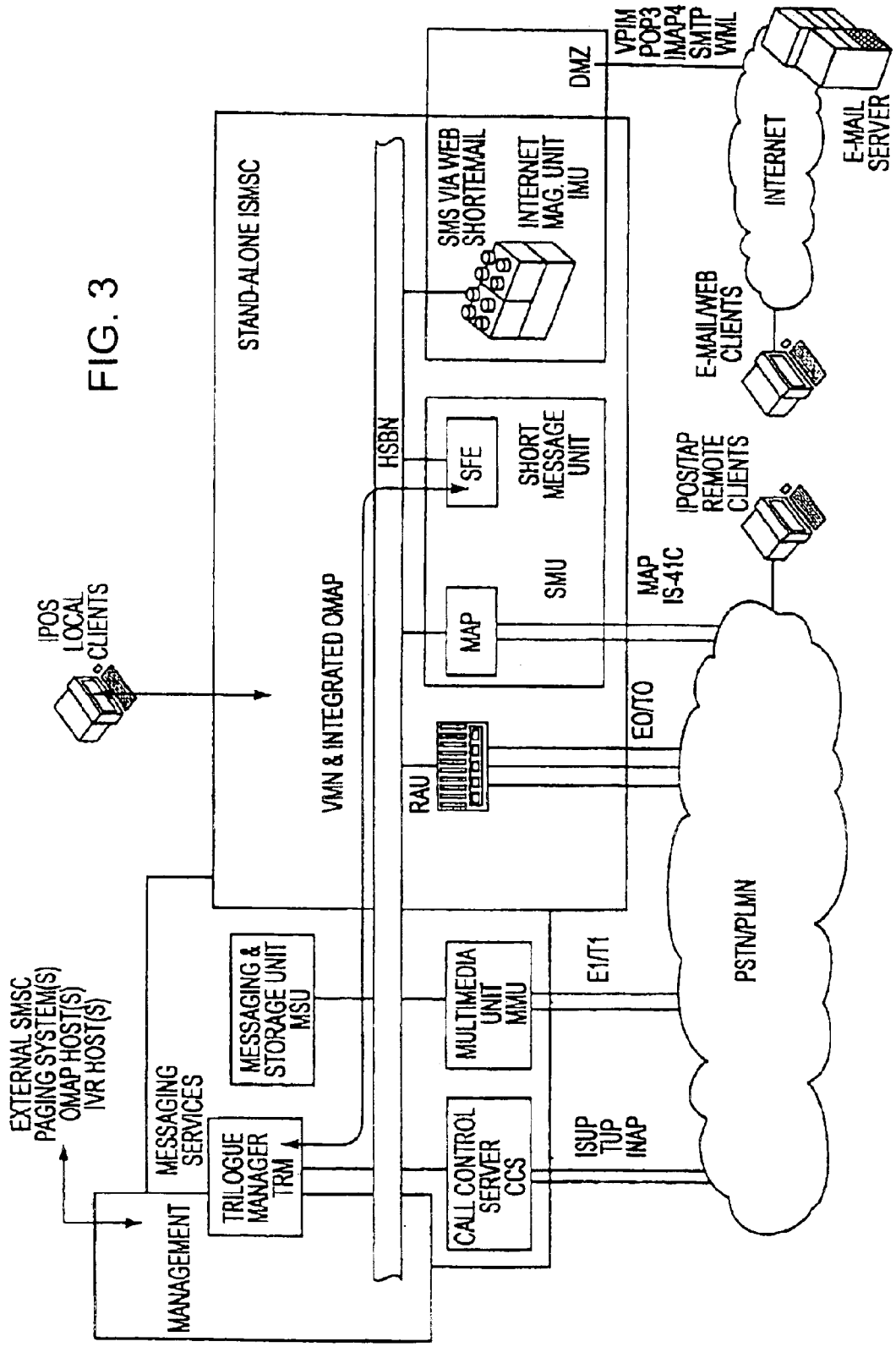
Figure 4:
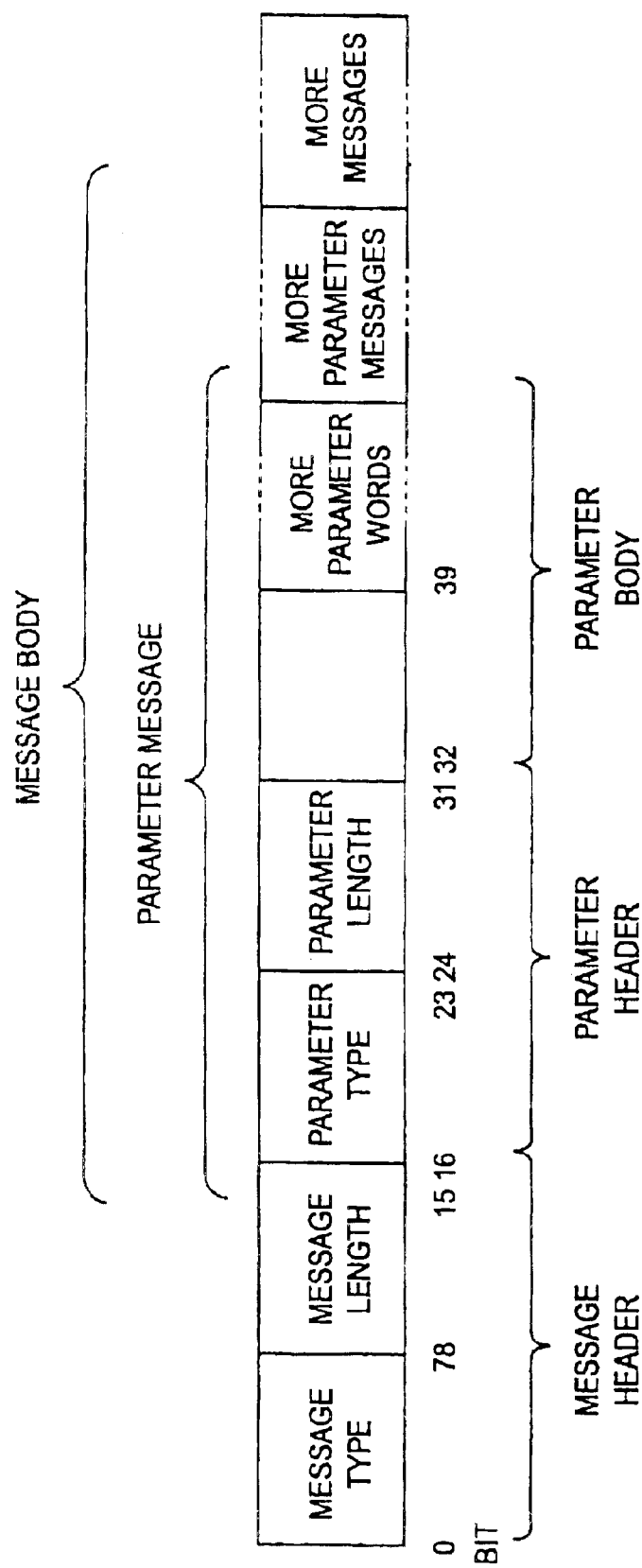
Figures 5, 8:
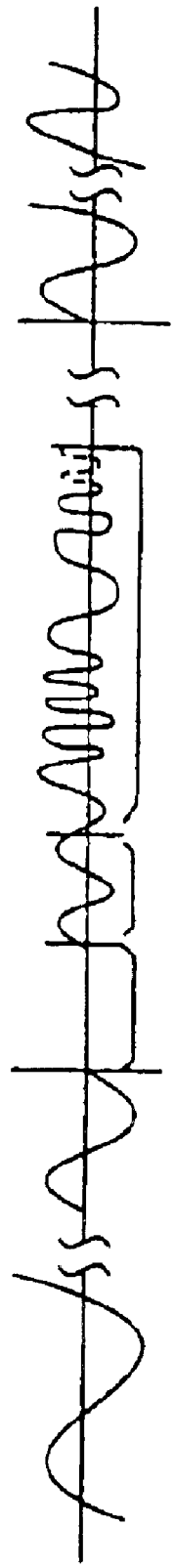
Figure 6:
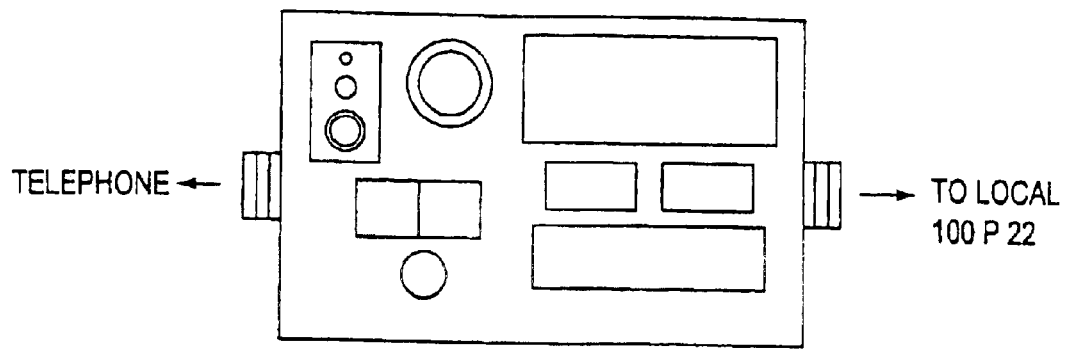
FIG. 6 is an exterior view of a device used in communication with the system.
Figure 7:
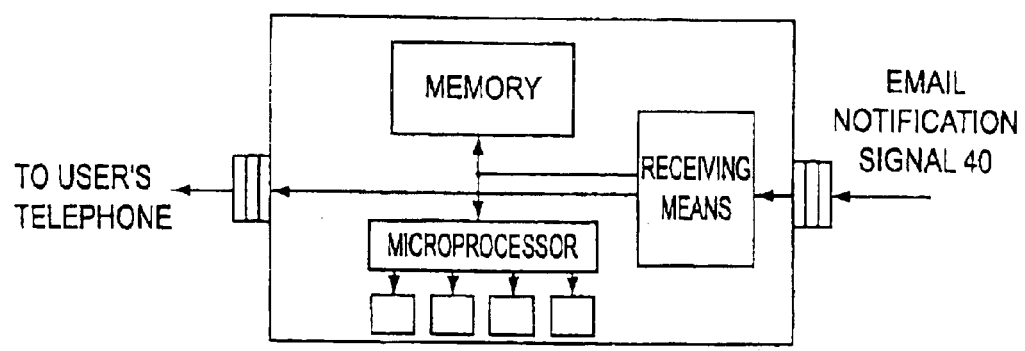
FIG. 7 is a block diagram of a display device used in communication with the system.

As illustrated in FIG. 3 the Comverse Network Systems ISMSC is one example of a SMSC, which integrates very well into the TRILOGUE INfinity architecture. Taking the technology and the service one step further provides full service capability of the subscriber to use a telephone (such as a mobile handset) to cover almost all functions that are available to PC subscribers. While retrieving messages the subscriber is in full control of the session and can command the system via spoken commands what to do. Usually the user interface for such interaction would start with the subscriber commanding the system to play the messages. Note that the actual session can start a bit differently with the subscriber first selecting or filtering which messages to be played. For example the subscriber might say "do I have messages from <name>." This phrase said by the subscriber will cause the system to filter all the messages from <name> and present a kind of folder to the subscriber with all the relevant messages ready. The subscriber then may choose between group actions like delete all or, scan through operation or playing the messages one by one. These functions are available to the subscriber via a PC interface but also via the telephone interface.

Another way to filter messages is to 'scan Email messages from <Name>'. This command filters messages (both type and sender), groups them together into a temporary folder and then reads (TTS) the headers to the subscriber one by one.

Once a message or a header is played, another set of actions is available to the subscriber. It is important to remember though that there is logical sequence of events, but it is not mandatory to follow it. For example, most of the people would scan the messages headers at least in order to decide on discarding message(s). However, the system does not prevent the following scenario.

Sys: 'Good Morning'
Sub: 'Delete all messages from yesterday'
Sys: '17 messages sent to recycle bin'
Sub: 'move to archive all email messages from John Dow'
Sys: 'done'.

The system allows message manipulation which in the history of voice mail system was enabled only after listening to the message, and providing similar functionality of a visual interface (an email for example). The system provides almost the same level of functionality via a telephone voice controlled user interface. Usually after or while the message is being played functions like the following are available to the subscriber:

7. Message storing commands like: save, delete, move to folder, retain new, next message, previous message etc.
8. Re-direction commands like forward, reply, reply all, etc.
9. Playback control commands like replay, softer, louder, faster, slower, pause, resume, fast forward, fast backward, header,
10. Cross application commands like call, get me
11. Media dependent commands like print, show/display In a Personal Assistant according to the present invention, all these commands are available on a voice-controlled basis. Most of them are trivial operation but the last two are kind of evolutionary.

When the subscriber uses the print command while listening (via TTS) to a textual in nature message (Fax, Email, Short Message) the subscriber might say commands like "print" and "show". Print means print this text message to my default printer address or to my default fax number. (note that media conversion might be required). The preference table defines the search order. If the subscriber wishes to print the message to another location, the subscriber may be using another redirection command or 'print to' command. This ability is extremely valuable for mobile professional subscribers that are 'listen' to their messages at the way to the office and can print while on the way all the relevant messages. Again although in most of the cases the subscriber would use that on a per message basis, another use could be 'print all', or 'print all my messages to my home fax'.

The ability to command the Personal Assistant system to forward email messages to the subscriber own SMS on a per command basis (ad-hoc). While the subscriber is reviewing the message in the mailbox, the subscriber might want to see a specific email message on the handset display. Simply by commanding the system show me for that message will convert that email message to a short message and will send it via the SMSC to the subscriber handset.

Once the subscriber commands the system to display the message, the system will then first analyze the subscriber address for displaying a text message the from the address book. (The same would applied for displaying a text message on someone else's display). Then it converts the message to the appropriate format (SM or WAP equivalent protocol) and then sends the message to the displayable device. The Personal Assistant dialogue can continue as sending the message is done as a background process.

Provisioning

In Voice Activated dialing applications as well as other Personal Assistant application, self provisioning of the personal Address Book is considered the most challenging part of the application. The provisioning of the Address Book could introduce an entry barrier to the service and prevent actual useful usage of the service.

Perhaps an example of the voice controlled user interface of an example would create the background for the instant provisioning need.

Example of existing voice controlled provisioning user interface:

Subscriber: 'Program'
Sys: 'Say Add, Delete or list'
Sub: 'Add'
Sys: 'Say Name'
Sub: '<Name>'
Sys: 'Say Name again'
Sub: '<Name>'
Sys: 'Say Name last time'
Sub: '<Name>'
Sys: 'Say Phone Number'
Sub: 'eight zero zero five five five one two one two'
Sys: 'Did you say 800-555-1212?'
Sub: 'Yes'
Sys: 'I'm adding <Name> with Phone number 800-555-1212, please say yes or no'

Sub: 'Yes'

This example is of course without any recognition failures. Even though still it is a long process and easy to understand why it might be an entry barrier if the subscriber would need to repeat that for each name, it is very often happened that subscribers do not provision more than 3–5 names to the Address Book. The usage of course is limited in the service and the subscriber's satisfaction with the service is limited. Note that many times there are some limitations with recognition of 10 digits number and repetition of the phone number may be required until successfully recognized. There are several techniques used in the industry to overcome the setup barrier, but no one vendor implements them all.

A system according to the present invention uses the following ways to simplify provisioning:

i. Improving recognition of telephone numbers
ii. DTMF entry of telephone numbers
iii. Single pass training for names input
iv. Web-Based personal provisioning of the Address Book
v. Import/Export files to the Address Book.
vi. Synchronization with existing Address Book (contacts list) on a PC
vii. Synchronization with existing Address Book on a PDA (Personal Digital Assistant like Palm Pilot for example)
viii. Smart phone (a telephone with a display and a keypad like Nokia 9000 for example) concurrent voice and data provisioning
ix. Instant provisioning (context sensitive provisioning)

The evolutionary approach of a Personal Assistant according to the present invention is to provide all these methods simultaneously, providing an innovative approach that was never used before. Many applications tried to deal with improving the recognition rate of telephone numbers. The main problems resides in the recognition of multiple words (digits). Today's speech recognition engine reaches recognition rate of approx. 98% for single word in fixed networks and about 97% recognition rate in mobile network. When considering the effective recognition rate of a ten digit telephone number it drops to $10^{0.97}$ which is a recognition rate of about 73%. This figure is unacceptable from the service point of view.

The Personal Assistant according to the present invention deals with this problem by using several techniques to improve the actual recognition rate. When the subscriber usage history is kept for a long time, the subscriber tenancy to use specific number more often are used when very similar numbers are spoken. The application recognizes telephone numbers according to the numbering plan of the network, including considering 7 or 10 digits for example, valid area codes etc. this information is coming together to recover simple recognition errors. Split numeric input accepts the area code first. The system will ask what is the area code first expecting three digits input and only afterwards will be looking for the rest of the number.

One of the techniques is to collect numeric input via DTMF keypad and not via spoken digits. The Personal Assistant supports concurrently both DTMF input and Speech Recognition automatic speech recognition (ASR) input. Furthermore the Personal Assistant offers automatic fallback from ASR to DTMF mode in a noisy environment or after several recognition errors.

To avoid the need of training the ASR for a specific name, a learning technique is implemented by the Personal Assistant. In this method, the user is ask to record the name for that entry (in the phone book) and then to enter the phone number(s). There is no request of the system to record the name again. It is common knowledge that the recognition improves when more than one recording is done, in general one can say that the recognition rate after first recording is around 80%, 90% after two recordings, 95% after the third, 96% and 97% after fourth and fifth respectively (these figures are dependent of course on the total number of names in the directory, but the same improvement scheme is applicable to almost any number of entries).

The Personal Assistant uses a learning technique to provide on one hand better setup procedure and yet maintain a high level recognition rate. The technique is to 'add' the recorded name each time that the subscriber uses that name. This of course improves the recognition during time and applies faster to the most used names.

The user interface for updating the directory is kept simple and easy to use, for example the following 'conversation' between the subscriber and the system might take place:

Sub: 'Add'
Sys: 'Who?'
Sub: 'John Dow'
Sys: 'What's the phone number'
Sub: '800-555-1212' (note that both ASR and DTMF can be used concurrently)
Sys: 'I'm adding John Dow, 800-555-1212'

Note that the subscriber can say 'no' at this phase if the phone number is incorrect or the name is not as it should be.

Later on, when the subscriber would like to place a call to John Dow and uses the Personal Assistant system to do that, the 'dialogue' between the subscriber the system could be as following:

Sub: 'Call'
Sys: 'Whom?'
Sub: 'John Dow' (Note that the system captures this utterance)
Sys: 'I'm calling John Dow'

The subscriber can say 'no' to stop the progressed call, for example if there was a recognition error. Yet if the subscriber does not actively cancel the call, the system assumes that the recognition was correct, and adds the new utterance to the existing pre-stored utterance of 'John Dow'.

This technique not only provides much better provisioning user interface but actually achieves better recognition over time as the different utterances uses in the recognition pattern are added to the pattern during different calls with statistically different vocalized environment. This actually 'builds' better recognition pattern which drives better recognition rates.

Figure 9:
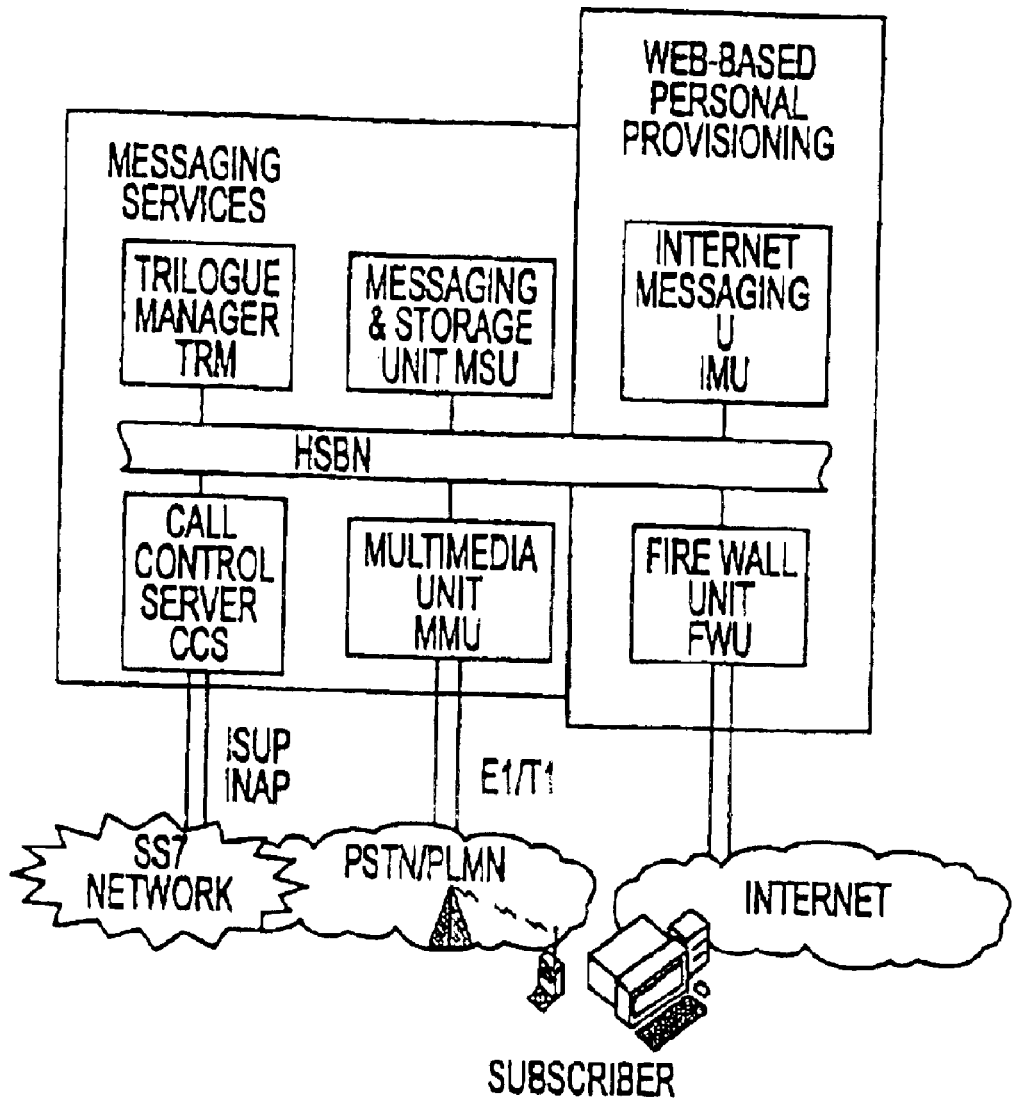

Provisioning of the subscriber's address book via the World Wide Web (Internet access) is one of the easier way to provision the address book. Providing a full visual interface pretty much like regular PC phone books (Microsoft®Outlook™ contact, LOTUS® organizer or any other contact manager, etc.) the subscriber can easily perform actions like add, delete, find, modify and of course display the information in the address book. The subscriber accesses the Personal Assistant (which includes an Internet multimedia unit (serving as a Web Server) and a firewall unit as illustrated in FIG. 9.

Figure 10:
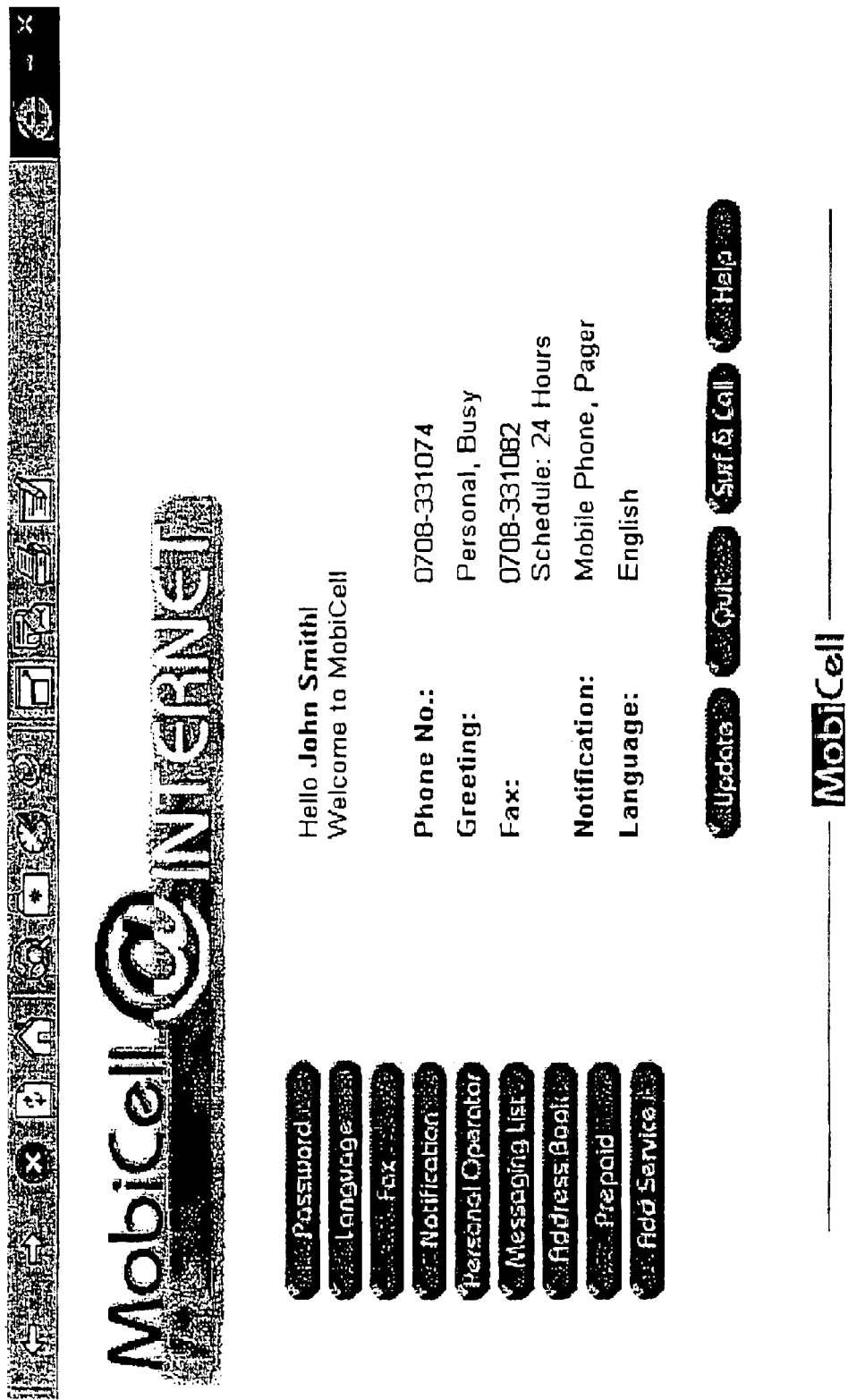
FIG. 10 is an example of a screen display produced when communicating with the system via the world wide web.

While surfing through the Web to the Network Operator home page the subscriber can link to a self-provisioning page. After an authentication procedure (usually username and password verification) the subscriber a self provisioning home page like that illustrated in FIG. 10. By 'clicking' the Address Book button, the subscriber address book will be opened and ready to be used for reviewing the information, adding new contacts, deleting an entry or modifying in the format illustrated in FIG. 11, for example. Of course when using PC capabilities, all the basic options of cut, copy and paste are always available to allow fast and easy practices of maintaining the Address Book. Different display formats are applicable as well, including multiple views (for example, street address is usually in the second view of the address book).

The subscriber can easily maintain all textual (alphanumeric) information but also may use the PC to record voice tags for the address book entries. These voice tags would be used later for both recognition of the spoken names, and announcing a name from the phone book. Alternatively the subscriber may mark an entry as requiring a voice tag, although a voice tag is not provided. Later on when the subscriber logs in to the system, the Personal Assistant system will indicate that there are entries without names in the address book which can be easily completed. If the subscriber selects to update (record) names for entries without names, the system will go over the list (read the list to the subscriber) and use text-to-speech technology to "speak" the name in the directory and ask the subscriber to record a name tag with his or her own voice. Note that voice tags are only required when small vocabulary voice recognition is being used, when using large vocabulary, key-in ASR technologies, there is no need for voice tags in order to recognize a spoken word or name.

With Internet connectivity as described above, the system provides importing and exporting (uploading and downloading) of a file in a standard format. An example could be ASCII file in the following format:

Name='John Dow', Home Phone='800-555-1212', . . . Voice Tag='Yes';
Name='Jane Dow', Home Phone='800-555-1212', . . . Voice tag='No'; . . .

The appropriate Address Book can be quickly and efficiently created by processing a file in this format. Another format example is an Microsoft®Excel® table format which can be generated and manipulated by Microsoft®Excel® and sent to update the Address Book and retrieved for additional processing. This method is by far more suitable for mass updates (for the subscriber via a PC interface but also via the telephone interface.

Synchronization with an existing address book (contacts list) on a PC takes the previous method one step further. Once there is some sort of an address book or a phone book on the PC (e.g., Lotus® Organizer™ or Microsoft®Outlook™ or any other type of contact manager on a PC), the Personal Assistant allows synchronization of the existing address book via a standard synchronization protocol (LDAP for example) or extensions to the standard. While running a window application on the PC, the subscriber is able to compare, copy, update, and synchronize the Personal Assistant address book and another address book concurrently. This ability is extremely valuable for subscribers that already have established their contacts list on a PC and do not wish to re-do the work of creating an address book from scratch.

Taking the synchronization another step further permits synchronization with virtually any electronic address book, such as an address book on a personal digital assistant (PDA) like a Palm™Pilot™ for example. Information from all PDA and electronic organizers, (including mobile phones that are capable of synchronizing with other devices) use a protocol to synchronize with a PC, including common address book applications on the PC. The Personal Assistant is capable of synchronizing with these PC-based application and therefore in a two step process information from the subscriber PDA can be updated and synched to the Personal Assistant directory.

A "smart" phone (a telephone with a display and a keypad like Nokia 9000, for example) provides a device that can be a mobile phone and a data device concurrently. The Personal Assistant offers to the subscribers of a smart phone concurrent provisioning of the address book. The display and keyboard can be used as a web-based personal provisioning unit to review, edit, add or delete entries to and from the address book and simultaneously use the telephone capabilities of the device to record name for new entries added. The Personal Assistant uses a standard protocol, like Wireless Application Protocol (WAP), or equivalent to transfer data to and from the device and use its telephone capabilities to make voice recordings. This method is very valuable for smart phone users as it provides the fastest, most integrated way to provision address book entries when recorded names (voice tags) are required.

Context Sensitive Provisioning:

The present invention also provides context sensitive provisioning. When the Personal Assistant system obtains partial information that could lead to a contact, it will allow the subscriber to complete the information and to save a new contact to the address book. There are many occasions when instant provisioning can be used, as described below.

Captured caller location information (CLI) with a message—This method is associated with recorded messages (standard call answering message). If a CLI was captured or if the caller left a telephone number associated with this message, this information will be stored with the message. As soon as the subscriber listen to the message, the subscriber can choose the 'add' option to add the caller to the Address Book. As the CLI is already captured the subscriber would need to record voice tag for that entry to have a new entry in the address book. The User Interface flow for this scenario will be as follows:

Sys: 'Main Menu'
Sub: 'Listen'
Sys: 'From Phone number <Phone Number>, received at: <Time> . . .'
Sys: plays the message
Sys: 'End of Message'
Sub: 'Add'
Sys: 'Name?'
Sub: <Name>
Sys: 'I'm adding <Name> with <Phone Number>'

Note that when the CLI is already in the address book, the system will introduce the caller in the message header prompt, for example, 'From <Name> received at . . .' obviously the add option at this case is irrelevant.

When the name already exists, the system will allow the subscriber to re-arrange the address book entry for that name, the assumption here is that the name already exist which means that there is at least one telephone number for name, now the CLI suggests that there is more than one. The subscriber will be guided to re-arrange the address book entry for that name.

For an incoming facsimile message, if the CLI was captured, then when the subscriber records a name tag, the system would know that the actual phone number is the contact facsimile number.

For an incoming email message, the sender of the message is normally captured and the subscriber can say 'add <name>' to provision the sender as the email address of the contact.

When the message originator is another subscriber of the system, then the system can automatically access all the public contact information available for the 'other subscriber' (sender) and allow quick update of many relevant contact information. Furthermore, the system will link the contact information from the subscriber to the other subscriber via the contacts list. If the sender subscriber changes an access method, the subscriber's address book will be updated automatically to reflect the change.

For example if the sender of the message (another subscriber of the Personal Assistant) phone number is 800-555-1212, then as soon as the subscriber says 'add <name>' all the relevant contact information available to other users (i.e., public) is updated in the address book of the subscriber. The subscriber can contact the sender at any location, including facsimile, email address and anything else that was available. Since the Personal Assistant is also responsible for automatic update of the links, if the sender's phone number changed (to 888-555-1515, for example), the subscriber's Address Book be updated for the sender subscriber.

When a subscriber commands the system to perform an action associated with a name (e.g. 'call <name>' or 'Send <name>') and the name does not exist in the Address Book. The system will allow the subscriber to enter (either spoken commands or DTMF) the phone number or address and to instantly add that to the Address Book, as in the following scenario:

Sub: 'Call John Smith'
Sys: 'phone number?'
Sub: '800-800-8000'
Sys: 'I'm calling John Smith at 800-800-8000'

The system will then add that new contact to the contact list. For future use by the subscriber, the next time that the subscriber would say 'call John Smith' the system will find the entry in the address book and will invoke the dial out.

If more information is provided up front, for example if the subscriber said 'call John Smith at the office' or 'Call John Smith at 800-800-8000', the Personal Assistant can use the information for more precise calls. These sentences provide more than just the name, but also a location or a phone number. Most of the information already exists, so the system needs very little (actually in the example of 'call john smith at 800-800-8000'—nothing at all) additional information to complete a provisioning of a new contact.

When a telephone number is used several times, the system monitors that and suggests the subscriber to record a name for that telephone number. For example:

Sub: 'call 555-1212'
Sys: 'Do you want to add that number to your Address Book?'
Sub: 'Yes'
Sys: 'Name?'
Sub: 'Directory assistance'

Additional partial information that can exist in the system and be used for instant or semi-automatic provisioning includes subscriber commands, the body of an email address, and personal number service dialogues. If the command said by the subscriber is being used for context provisioning, for example, when the subscriber says 'call John Dow' and there is no phone number, the system will ask for a phone number. Yet if the subscriber said 'Fax John Dow' and there is an entry for John Dow but no fax number, the system will ask for fax number.

The system can scan through email messages to look for contact information format (a type of business card pattern). If the format is found, the system will suggest the subscriber to build a new contact for the sender. Furthermore using LDAP and VPIM protocols the contact information can be obtained from sender side over the Internet. The system would use that capability to obtain contact information and create a fully detailed contact for the sender.

When a personal number service (PNS) is offered by the system, a caller might be asked not only for their name, but also for multiple contact information, like phone, mobile phone, email address, fax number and more. All that is saved along with the caller's name (and/or message) and can be used for instant provisioning by the subscriber or as ad hoc contact information.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An information services system, comprising:
   a communication device to produce an instruction to reach a contact in response to a call request from a subscriber; and
   an information services platform, connectable to said communication device, to store items of contact information for the contact under control of the subscriber and to attempt to reach the contact using the items of contact information selected in a sequence based on a probability of reaching the contact, upon receipt of the instruction from said communication device.

2. An information services system as recited in claim 1, wherein said information services platform includes
   an outdial unit; and
   an interactive voice response unit, coupled to said outdial unit, to determine whether a completed call has reached the contact.

3. An information services system as recited in claim 2, wherein said interactive voice response unit is connectable to said communication device to report on progress of the attempt to reach the contact.

4. An information services system as recited in claim 3, wherein said information services platform further includes a database unit, coupled to said interactive voice response unit and said outdial unit to store the items of contact information, including at least one of a telephone number, a pager number, an e-mail address, a voicemail box number and a facsimile number for the contact.

5. An information services system as recited in claim 4, wherein said database unit also stores preference information and history usage indicating the probability of reaching the contact.

6. An information services system as recited in claim 3, wherein said interactive voice response unit prompts the subscriber for a signal to continue with the sequence when use of one of the items of contact information does not result in reaching the contact.

7. An information services system as recited in claim 4, wherein said database unit also stores data indicating successfulness of previous attempts to reach the contact using at least one of the items of contact information.

8. An information services system as recited in claim 1, wherein said information services platform performs the sequence in a predetermined order.

9. An information services system as recited in claim 8, wherein said information services platform also stores preference information and history usage indicating the probability of reaching the contact, associated with the items of contact information.

10. An information services system as recited in claim 1, wherein said communication device sends sequence information to said information services platform to define the sequence.

11. An information services system as recited in claim 10,
   wherein said communication device sends voice signals as the sequence information, and
   wherein said information services platform processes the voice signals in determining the sequence.

12. An information services system as recited in claim 1, wherein the sequence is based on a number of un-tried locations and the probability of the contact answering at each.

13. A method of establishing communication, comprising:
   "outputting to a user an indication of an attempt by a contact to reach the user";
   receiving a call request from the user in response to the indication to reach the contact using items of contact information previously stored for the contact; and
   attempting to reach the contact by selecting from the items of contact information in an order automatically determined on a probability of reaching the contact.

14. A method of establishing a telephone connection, comprising:
   "outputting to a user an indication of an attempt by a person to contact the user";
   attempting to establish a telephone connection to the person at a first telephone number in accordance with a call request received from the user in response to the indication; and
   selecting a second telephone number for said attempting, based on a probability of reaching the person.

15. A method of establishing a telephone connection, comprising:
   displaying an electronic message from another person to a user;
   attempting to establish a telephone connection to the other person at a first telephone number associated with the electronic message in response to a call request from the user; and
   selecting a second telephone number for said attempting, based on a probability of reaching the other person.

16. A method as recited in claim 15, further comprising
   storing the first telephone number by an information services system prior to displaying the electronic message; and
   associating the electronic message with the first and second telephone numbers by said information services system.

17. A method as recited in claim 16, wherein said establishing results in a switched connection to transmit a substantially continuous stream of voice signals.

18. A method as recited in claim 16, wherein said establishing includes an internet protocol telephony connection.

19. A method as recited in claim 15, wherein said establishing includes an internet protocol telephony connection.

* * * * *